US011982969B2

(12) United States Patent
Monden

(10) Patent No.: US 11,982,969 B2
(45) Date of Patent: May 14, 2024

(54) POST-PROCESSING APPARATUS

(71) Applicant: CANON KABUSHIKI KAISHA, Tokyo (JP)

(72) Inventor: Noriyuki Monden, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 17/517,517

(22) Filed: Nov. 2, 2021

(65) Prior Publication Data

US 2022/0146977 A1 May 12, 2022

(30) Foreign Application Priority Data

Nov. 6, 2020 (JP) ................................ 2020-185688

(51) Int. Cl.
*G03G 15/00* (2006.01)
*B26D 5/06* (2006.01)

(52) U.S. Cl.
CPC ........... *G03G 15/6582* (2013.01); *B26D 5/06* (2013.01); *G03G 15/6538* (2013.01); *G03G 2215/00818* (2013.01)

(58) Field of Classification Search
CPC ........... G03G 15/6538; G03G 15/6582; G03G 2215/00818; G03G 15/80; B26D 5/06
See application file for complete search history.

(56) References Cited

U.S. PATENT DOCUMENTS 10,071,494 B2 9/2018 Pantonial
2002/0076232 A1* 6/2002 Taneko .............. G03G 15/5004 399/88
2007/0227324 A1* 10/2007 Baba .................... B26D 7/1818 83/37
2012/0082497 A1* 4/2012 Nagasaki ........... G03G 15/6544 227/7
2017/0144321 A1* 5/2017 Pantonial .................. B26F 1/14
2019/0218052 A1* 7/2019 Takemura .............. B65H 29/46

FOREIGN PATENT DOCUMENTS

JP H10-279170 A 10/1998
JP H11-255416 A 9/1999
JP 2010115746 A 5/2010
JP 2016160061 A 9/2016
JP 2018167976 A * 11/2018

* cited by examiner

*Primary Examiner* — Jennifer Bahls

(74) *Attorney, Agent, or Firm* — Canon U.S.A., Inc. I.P. Division

(57) ABSTRACT

A post-processing apparatus to perform a post-processing for a sheet conveyed from an image forming apparatus includes a punching unit, first and second motors, and a control unit. The punching unit includes a punch that is rotated by the first motor to punch the sheet, and a moving unit moved by the second motor to move the punch in a width direction intersecting with a sheet conveying direction. The control unit controls at least the first motor. In a first section from a first position in which the punch starts punching the sheet to a second position in which the punching ends, the control unit sets a current value for driving the first motor to a first current value. In a second section other than the first section, the control unit can set the first motor driving current value to a second current value lower than the first current value.

11 Claims, 10 Drawing Sheets

POST-PROCESSING APPARATUS

BACKGROUND OF THE DISCLOSURE

Field of the Disclosure

The present disclosure relates to a post-processing apparatus including a sheet punching device configured to punch a binding hole in a sheet on which an image is formed by an image forming apparatus such as a copying machine or a printer.

Description of the Related Art

Conventionally, there is a punch system provided with a punch, a punch moving unit, a registration member, and a sheet end position detection device. The punch makes holes in the sheet being conveyed. The punch moving unit moves the punch in a direction orthogonal to the sheet conveying direction. The registration member corrects a skew of the sheet. The sheet end position detection device detects a position of an end of the sheet in the direction orthogonal to the sheet conveying direction. Japanese Patent Application Laid-Open No. H10-279170 proposes a technique of punching in a predetermined position of the sheet after the punch is moved in accordance with the position of the end of the sheet.

U.S. Pat. No. 10,071,494 proposes a technique of punching a sheet using a rotary punch without stopping a conveyance of the sheet. At present, a punch system has been devised in which the above-described mechanisms are combined to detect a skew of a sheet without using the registration member and to punch in a predetermined position of the sheet while moving the rotary punch in accordance with the position of the end of the sheet.

SUMMARY OF THE DISCLOSURE

The disclosure provides a post-processing apparatus which reduces power consumption of a punching unit and suppresses an operating sound of the punching unit.

According to an aspect of the present disclosure, a post-processing apparatus to perform a post-processing for a sheet conveyed from an image forming apparatus includes a punching unit configured to punch the sheet, wherein the punching unit includes a punch configured to rotate to punch the sheet, and a moving unit configured to move the punch in a width direction intersecting with a sheet conveying direction, a first motor configured to rotate the punch, a second motor configured to move the moving unit, and a control unit configured to control at least the first motor, wherein in a first section from a first position in which the punch starts punching the sheet to a second position in which the punching ends, the control unit sets a current value for driving the first motor to a first current value, and wherein in a second section other than the first section, the control unit can set the current value for driving the first motor to a second current value lower than the first current value.

Further features of the present disclosure will become apparent from the following description of exemplary embodiments with reference to the attached drawings.

DESCRIPTION OF THE EMBODIMENTS

The following is a description of the embodiments of the present disclosure with reference to the accompanying drawings.

First Embodiment

[Description of Configuration of Post-Processing Apparatus and Image Forming Apparatus]

Figure 1:
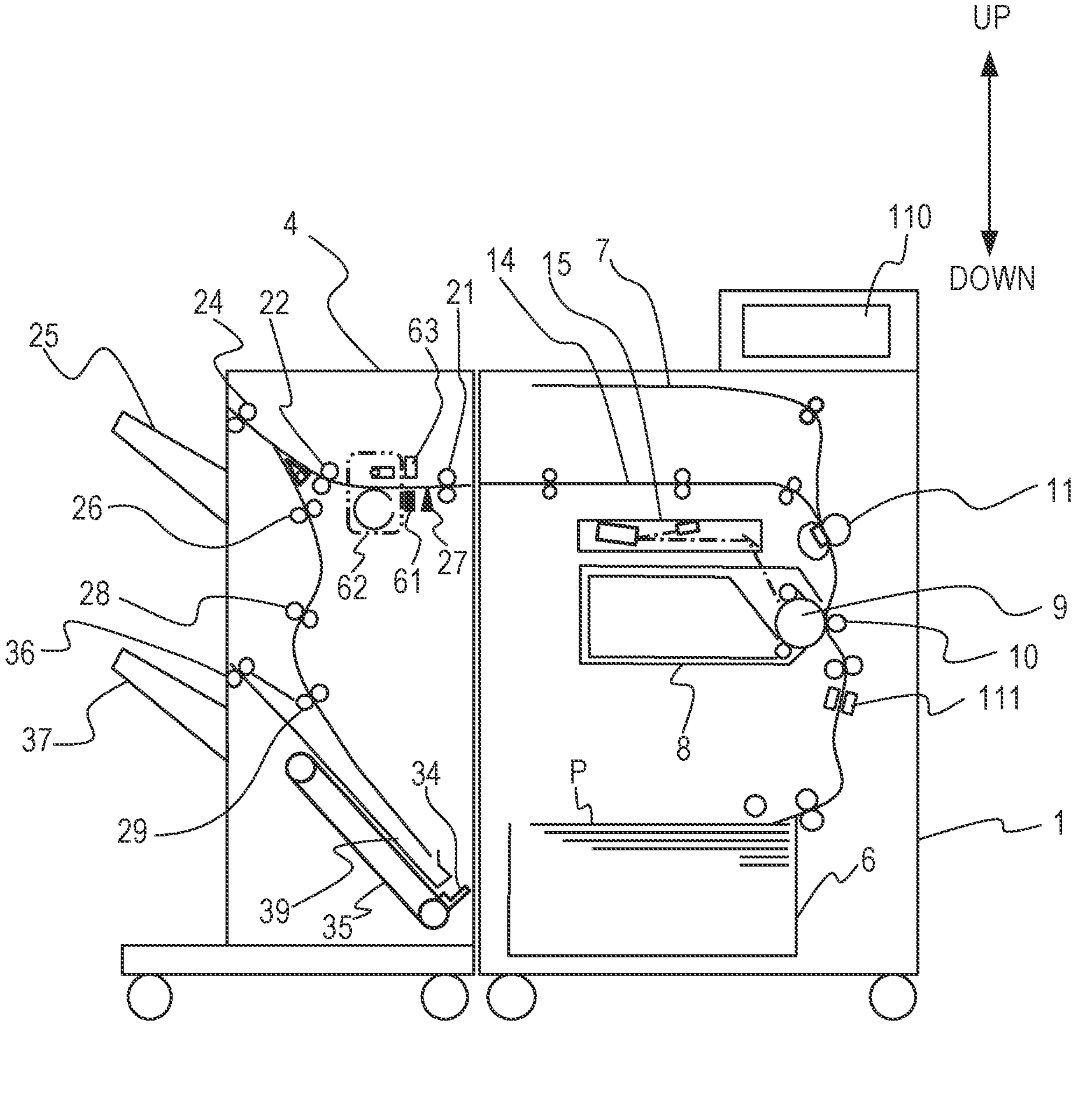
FIG. 1 is a cross-sectional view of a post-processing apparatus and an image forming apparatus according to a first and second embodiments.

FIG. 1 is a cross-sectional view showing a configuration of an electrophotographic image forming apparatus 1 and a post-processing apparatus 4. A vertical direction is indicated by a double-headed arrow in FIG. 1. The post-processing apparatus 4 performs various post-processing such as a punching processing and a staple processing on a sheet P on which an image is formed by the image forming apparatus 1. The image forming apparatus 1 is provided with a feeder 6 configured to contain a plurality of sheets P and feed the sheets P one by one. A sheet type sensor 111 arranged in a conveying path discriminates a sheet type (thin paper, plain paper, thick paper, basis weight, etc.) of a sheet P fed from the feeder 6. The sheet P is conveyed to a photosensitive drum 9 which is an image bearing member rotatably supported by a cartridge 8 and a transfer roller 10 which is a transfer unit to which a predetermined voltage is applied. A toner image is formed on the surface of the photosensitive drum 9 through the processes of exposure, charging, latent image formation and development in the cartridge 8. The latent image formation is performed by a laser scanner unit 15 which scans a laser beam in a direction (main scanning direction) orthogonal to the conveying direction of the sheet P by a rotary polygon mirror and a lens to form a latent image.

The sheet P on which an unfixed toner image is heated and pressurized by a fixing unit 11. The sheet P to which the toner image is fixed is discharged to a discharge tray 7. In a case in which the sheet P is discharged to the post-processing apparatus 4, the sheet P is sent to a horizontal conveying portion 14 after the sheet P is discharged from the fixing unit 11. The sheet P conveyed from the horizontal conveying portion 14 is delivered to a punch inlet roller 21 of the post-processing apparatus 4. An inlet sensor 27 as a first detection device is disposed downstream of the punch inlet roller 21 in the conveying direction (hereinafter referred to simply as downstream). The inlet sensor 27 is disposed to detect a timing of passage of a leading end and a trailing end of the sheet P received by the punch inlet roller 21 and a presence or absence of a sheet jam.

A rotary punch unit 62 as a punching unit, a line sensor 61 comprising a plurality of light receiving elements as a second detection device, and a light emitting unit 63 are disposed downstream of the inlet sensor 27. The punch unit 62 includes a punch 202 and a die 205 shown in FIG. 3A. The line sensor 61 and the light emitting unit 63 face each other, and light is uniformly irradiated from the light emitting unit 63 to the line sensor 61. In a case in which the conveyed sheet P enters between the line sensor 61 and the light emitting unit 63, light emitted from the light emitting unit 63 is blocked by the sheet, and a position of the shielded light receiving element is detected as a position of the end of the sheet P (hereinafter referred to as an end position). A punch unit moving portion 104, which is the moving unit, shown in FIG. 2 moves the punch unit 62 in a direction (hereinafter referred to as a width direction) orthogonal to the conveyance direction based on the end position of the sheet P detected by the line sensor 61. After the punch unit 62 is moved to a predetermined position, a post-processing controller 101 drives the punch unit 62 to rotate to punch the sheet P. Details of the punching operation of the punch unit 62 will be described in [Functions and Configurations] and [Moving Punch Unit and Punching].

After the sheet P is punched by the punch unit 62, the sheet P is conveyed by a punch outlet roller 22 and a roller 24 rotated by a driving source (not shown) and discharged to an upper tray 25. In the post-processing apparatus 4, a lower tray 37 is arranged in addition to the upper tray 25, so that a plurality of trays are provided as discharge destinations of the sheet P. Each of the two trays is raised and lowered by the driving source (not shown) according to a bundle amount (thickness of a bundle (hereinafter referred to as a sheet bundle) composed of a plurality of sheets P) of sheets P stacked on the tray. In a case in which a discharge destination of the sheet P is the lower tray 37, the sheet P is temporarily stopped just before being discharged to the upper tray 25. The sheet P is switched back by the roller 24 and conveyed to a roller 26. The sheet P is conveyed to an intermediate stacking portion 39 by the roller 26, a roller 28 and a roller 29 rotated by the driving source (not shown). The sheets P are aligned in the conveying direction and in the width direction in the intermediate stacking portion 39, and after an alignment of the predetermined number of sheets P is completed, a stapler (not shown) performs a binding operation. Thereafter, the sheet bundle is pushed out by a parallel movement of a discharge guide 34 connected to a guide driving portion 35 in a direction of a discharge roller 36, and the sheet bundle is discharged to the lower tray 37. A control panel 110 is for the user to manually set the size and type (sheet type) of the sheet P. The image forming apparatus 1 and the post-processing apparatus 4 are controlled based on information set using the control panel 110.

[Functions and Configurations]

Figure 2:
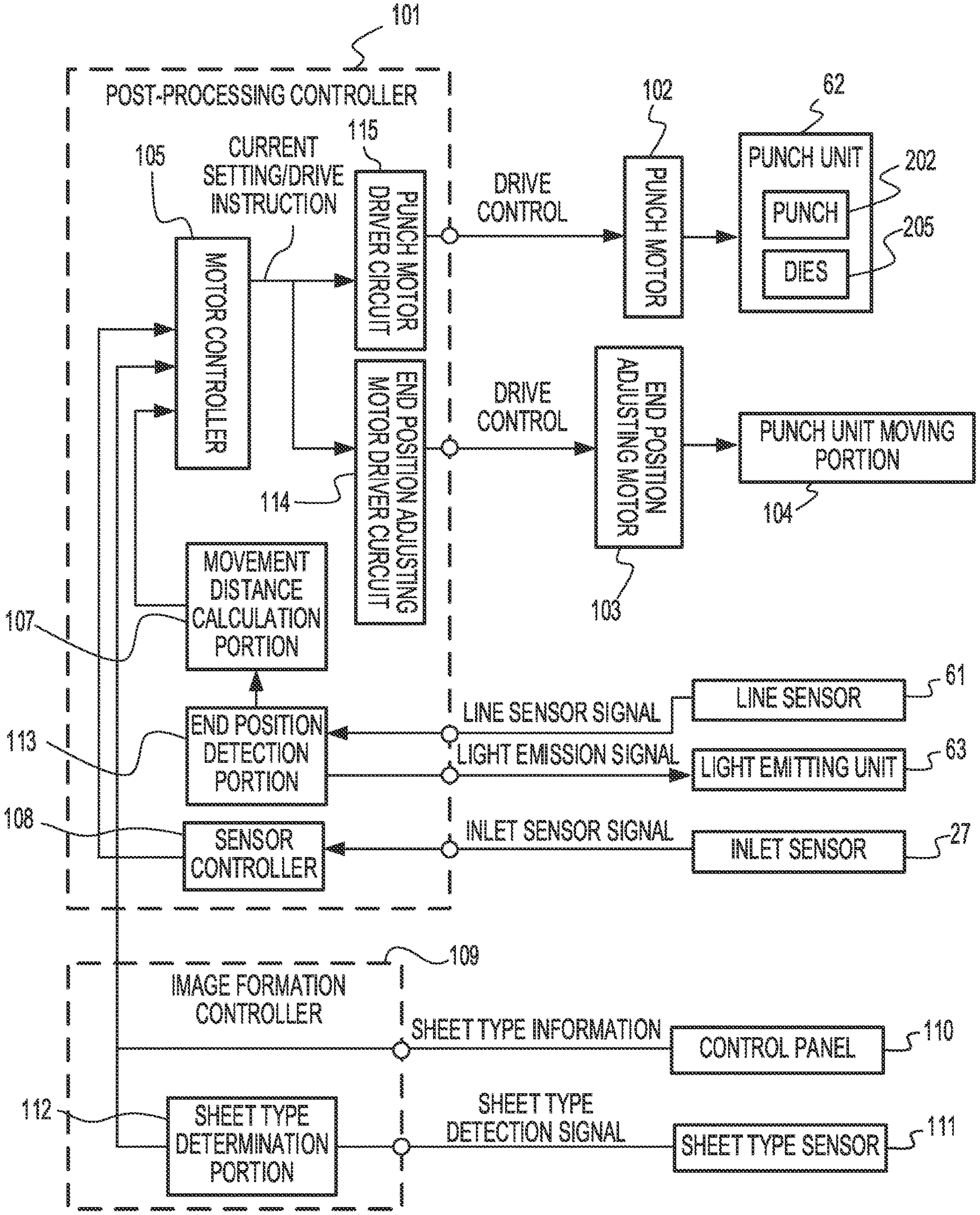
FIG. 2 is a block diagram of the post-processing apparatus and the image forming apparatus according to the first and second embodiments.

FIG. 2 is a block diagram illustrating functions and configurations of the image forming apparatus 1 and the post-processing apparatus 4 shown in FIG. 1. Here, only a portion relating to a control of punching the sheet P are extracted. The post-processing apparatus 4 includes the post-processing controller 101 configured to control a sheet punching operation, a movement operation of the punch unit 62, and a detection operation of an end position of the sheet P. The post-processing controller 101 as a control unit includes a motor controller 105, a punch motor driver circuit 115, an end position adjusting motor driver circuit 114, a movement distance calculation portion 107 of the punch unit 62, an end position detection portion 113, and a sensor controller 108. An image formation controller 109 has a function of performing an image forming control of the image forming apparatus 1. The image formation controller 109 has a sheet type determination portion 112. The sheet type determination portion 112 receives a sheet type detection signal as a detection result of the sheet type sensor 111. The image formation controller 109 acquires (receives) sheet type information, which is information related to the sheet type of the sheet P inputted by using the control panel 110. The image formation controller 109 can deliver the sheet P conveyed in synchronization with the post-processing controller 101, and can transmit the sheet type information of the sheet P and the sheet type information based on the sheet type detection signal to the post-processing controller 101.

The motor controller 105 controls the punch motor driver circuit 115 and the end position adjusting motor driver circuit 114 by setting a current and giving a driving instruction. Thus, the motor controller 105 drives each motor under a predetermined driving condition (driving frequency, current setting, excitation system, etc.). Hereinafter, two motors (a punch motor 102 and an end position adjusting motor 103) described in the first embodiment will be described as stepping motors. The punch motor driver circuit 115 drives the punch motor 102, which is a first motor, to rotate the punch unit 62. The end position adjusting motor driver circuit 114 drives the end position adjusting motor 103, which is a second motor, to move the punch unit moving portion 104 in the width direction.

The sensor controller 108 detects a presence or absence of the sheet P from a change in an output signal (hereinafter also referred to as an inlet sensor signal) of the inlet sensor 27, and outputs a detection result to the motor controller 105. The end position detection portion 113 transmits a light emission signal to the light emitting unit 63 to cause the light emitting unit 63 to emit light at a predetermined amount of light, and detects the end position of the sheet P from an output signal (hereinafter also referred to as a line sensor signal) of a plurality of elements outputted from the line sensor 61. The movement distance calculation portion 107 of the punch unit 62, which is a calculation unit, determines (calculates) a movement distance (distance) of the punch unit 62 from an information of the end position of the sheet P detected by the end position detection portion 113, and outputs a calculated result to the motor controller 105. The functions and configurations of the image forming apparatus 1 and the post-processing apparatus 4 have been described above.

[Punching Section of Punch Unit]

Next, the punch unit 62 will be described with reference to FIGS. 3A to 3D. In FIGS. 3A to 3D, the conveying direction of sheet P is indicated by the arrow. In FIGS. 3A to 3D, the punch 202 and the die 205 of the punch unit 62 are pivotally supported by a casing (not shown). A gear (not shown) fixed to one end of a support shaft 65 of the punch 202 and a gear (not shown) fixed to one end of a support shaft 66 of the die 205 are engaged with a gear (not shown) provided to an output shaft of the punch motor 102. The punch 202 is rotatable in a clockwise direction in FIGS. 3A to 3D and the die 205 is rotatable in a counterclockwise direction in synchronization with a rotation of the punch motor 102. The die 205 is provided with a die hole 206 provided at a position corresponding to the punch 202. FIGS. 3A to 3D show how the sheet P is punched by the punch unit 62, which is a punching device, over time.

Figure 3A:
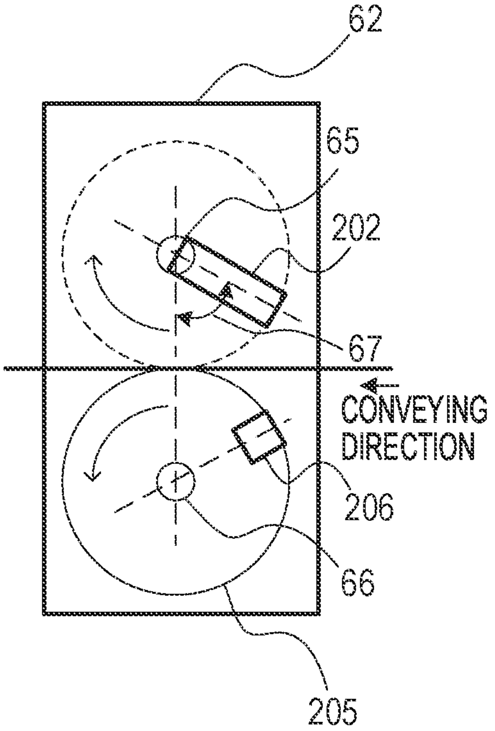
FIGS. 3A, 3B, 3C, and 3D are cross-sectional views of a punch unit according to the first and second embodiments.
Figure 3B:
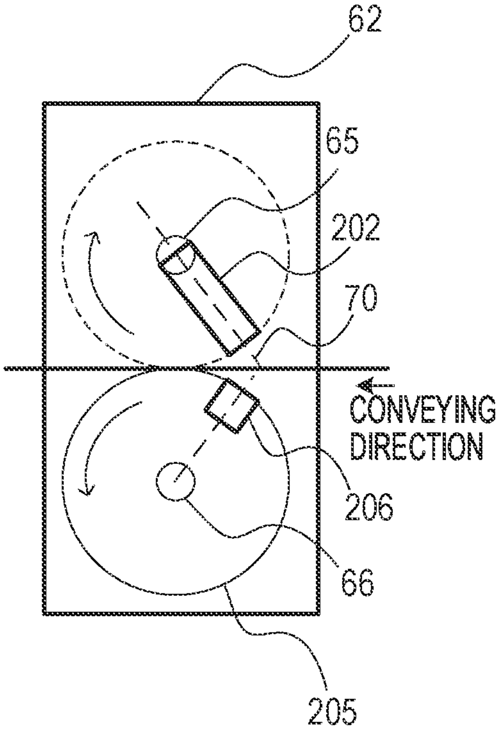
Figure 3C:
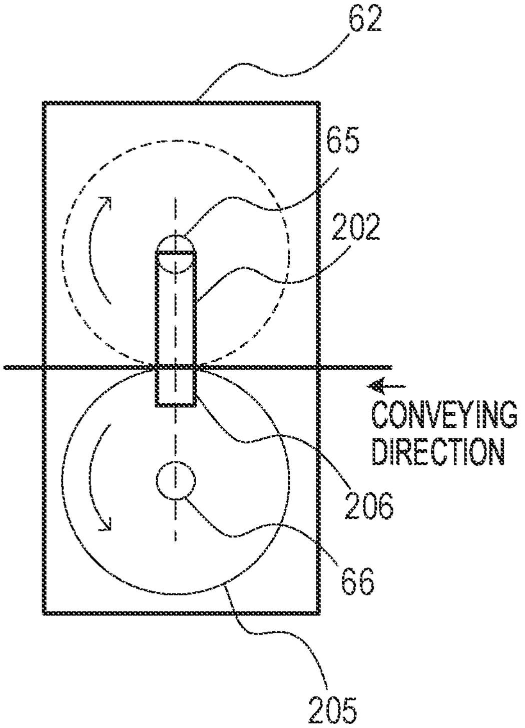
Figure 3D:
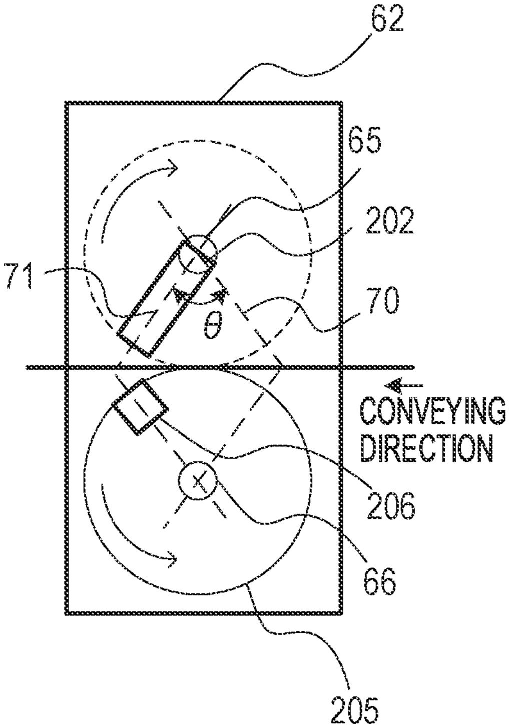

FIG. 3A shows that a rotational position of the punch 202 is at a home position. Here, a position, shown in FIG. 3C, in which the sheet P is punched is called a punching position, and a position of the imaginary line connecting the support shaft 65 and the support shaft 66 is called a punch center position. The punch 202 in FIG. 3A is at a position in front of the punch center position by an angle indicated by an arrow 67 in a rotational direction, and the punch 202 is normally stopped at this position to wait for the sheet P being conveyed. Even if the punch 202 is stopped at the home position, the punch 202 does not prevent the sheet P from being conveyed. FIG. 3B shows that the rotational position of the punch 202 is at a punching start position 70, which is a first position at which the sheet P starts to be punched. FIG. 3C shows the punching position, a position in which the punch 202 and the die hole 206 are exactly engaged so that the sheet P is punched. FIG. 3D shows that the rotational position of the punch 202 is at a punching end position 71, which is a second position in which the punching ends.

The motor controller 105 starts the rotation drive of the punch unit 62, which is kept waiting at the home position, by the punch motor 102 at a predetermined timing, in synchronization with a timing in which a leading end position of the sheet P is detected by the inlet sensor 27 via the sensor controller 108. The motor controller 105 matches a conveyance speed of the sheet P with the rotation speed of the punch unit 62, so that the sheet P can be punched in a desired position on the sheet P without stopping the conveyance of the sheet P. A punching section as a first section from the first position to the second position of the punch unit 62 has been described above.

[Moving Punch Unit and Punching]

Next, a movement operation of the punch unit 62 will be described by taking an example of a case in which 3 holes are punched in a plurality of sheets P being skew conveyed. The later described [About Electric Power and Operating Sound of Motor], [Method of Reducing Electric Power and Operating Sound], and [Flowchart of Punching and Movement Operation] will be described using the same case.

Figure 4A:
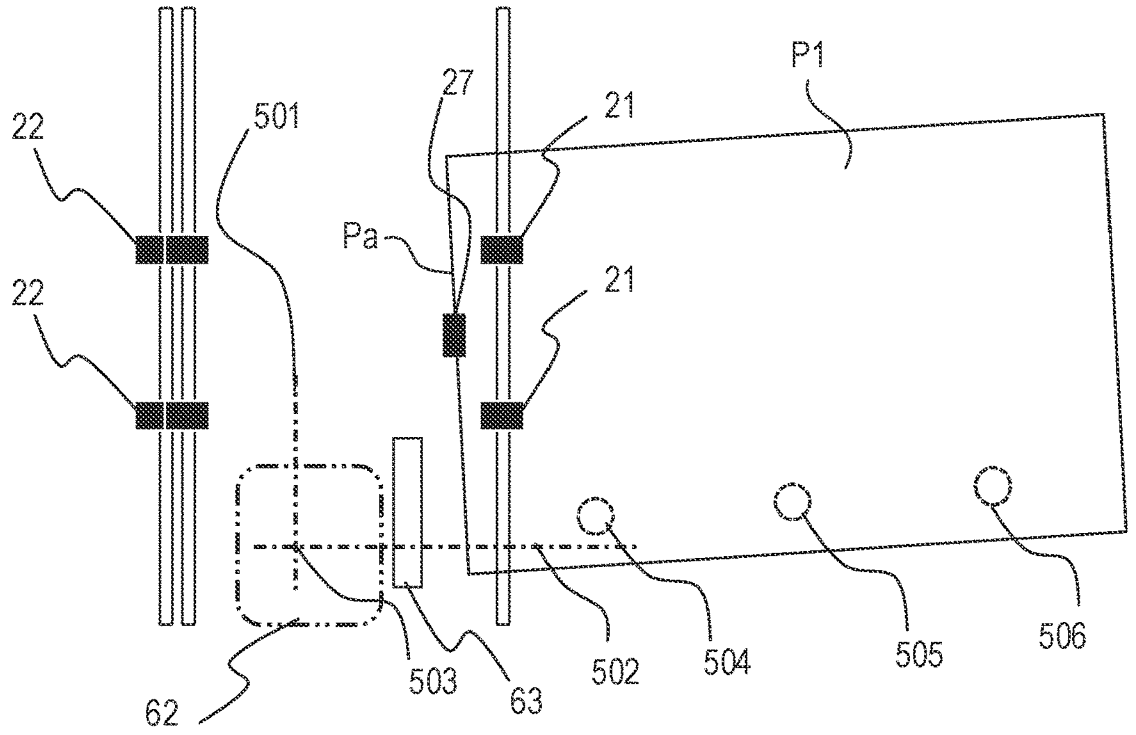
FIGS. 4A, 4B, 4C, 4D, 4E, 4F, 4G, and 4H are views showing a movement operation and a punching operation of the punch unit according to the first and second embodiments.
Figure 4B:
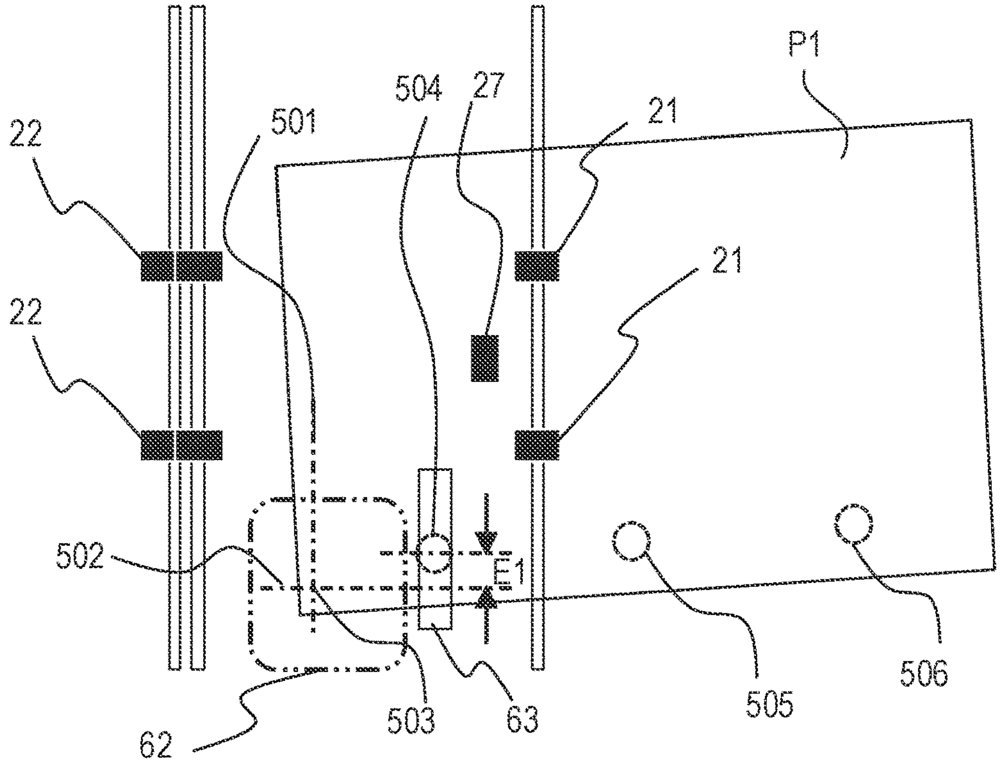
Figure 4C:
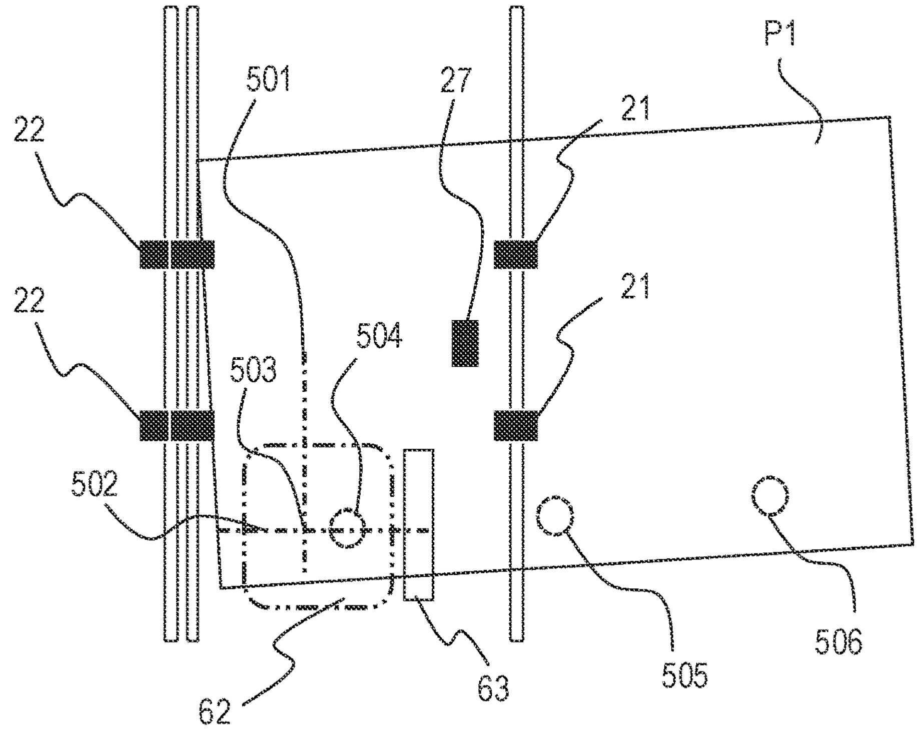
Figure 4D:
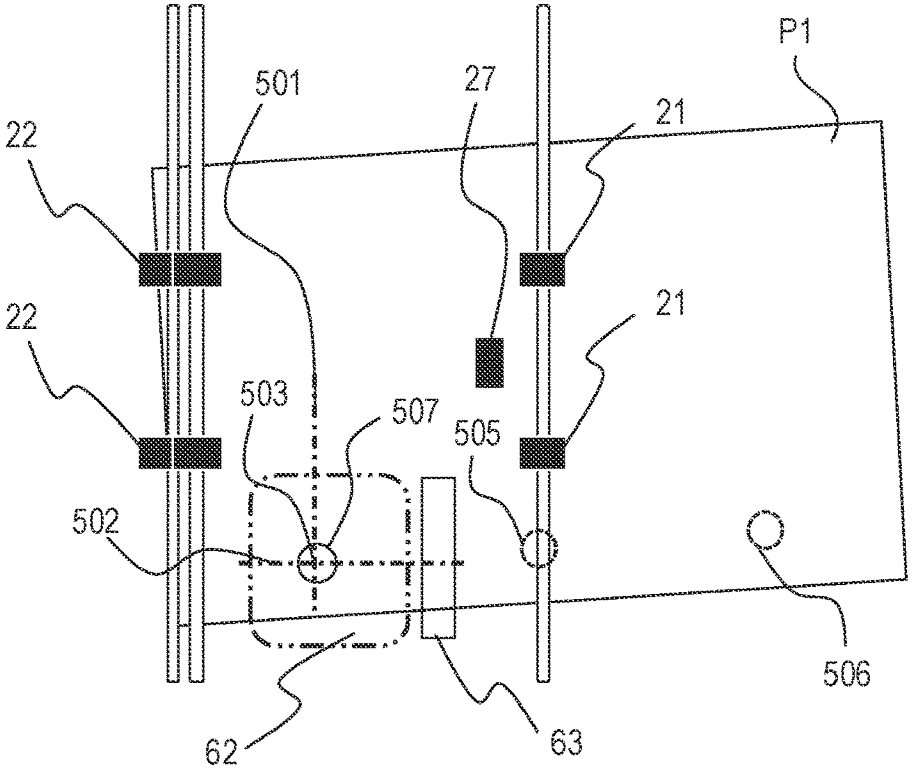
Figure 4E:
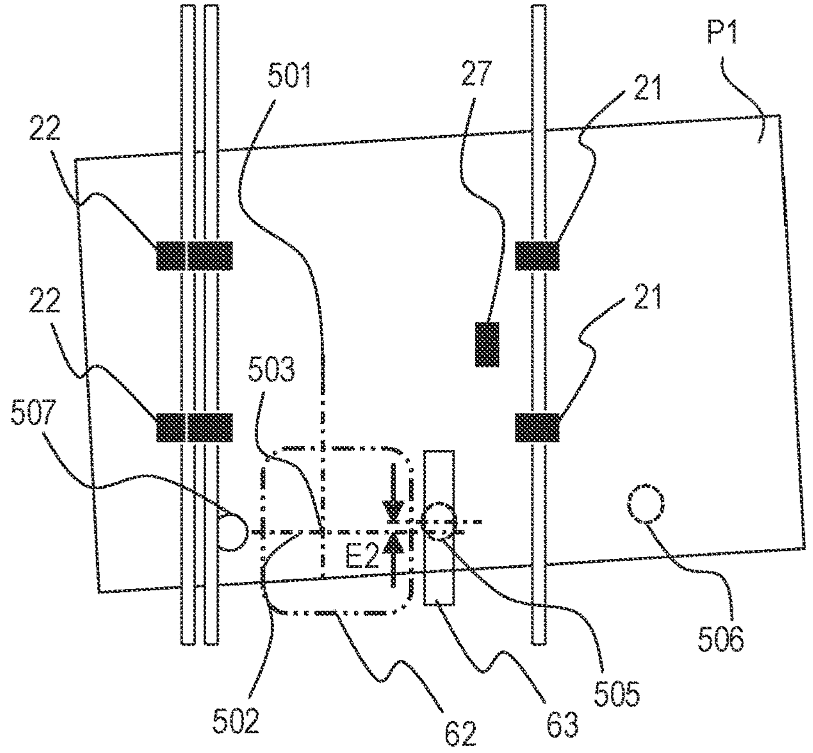
Figure 4F:
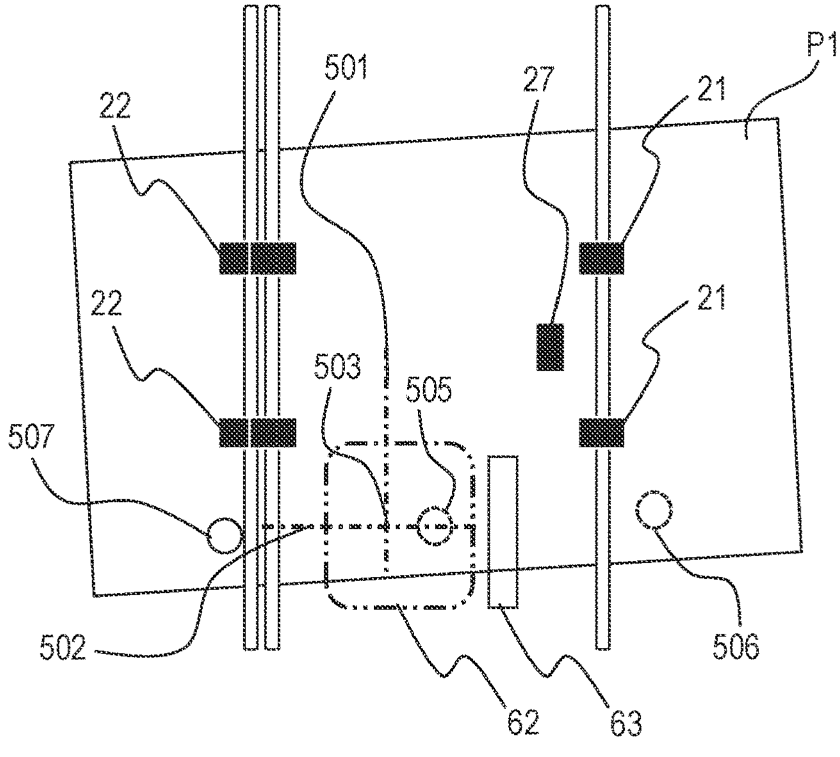
Figure 4G:
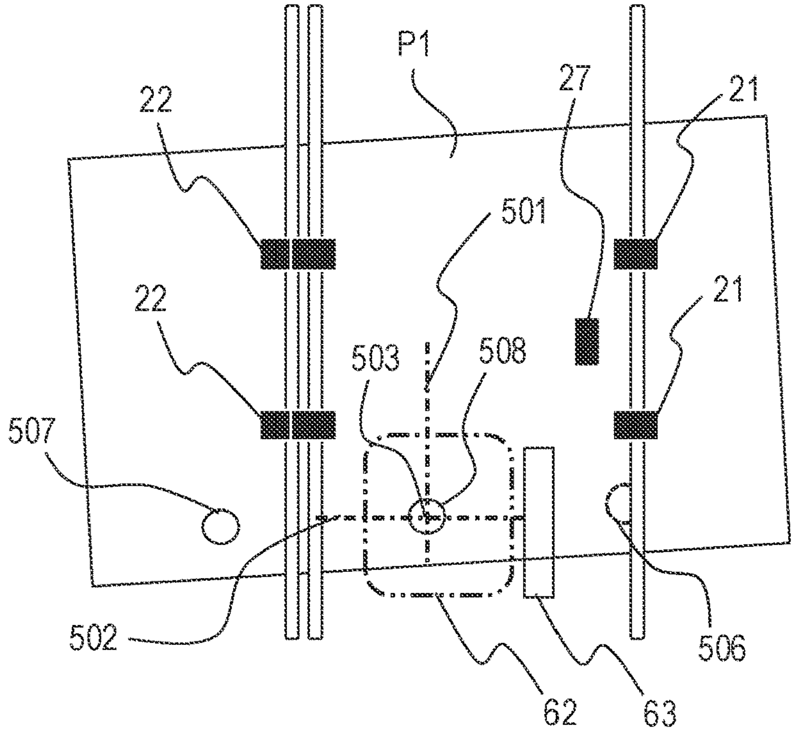
Figure 4H:
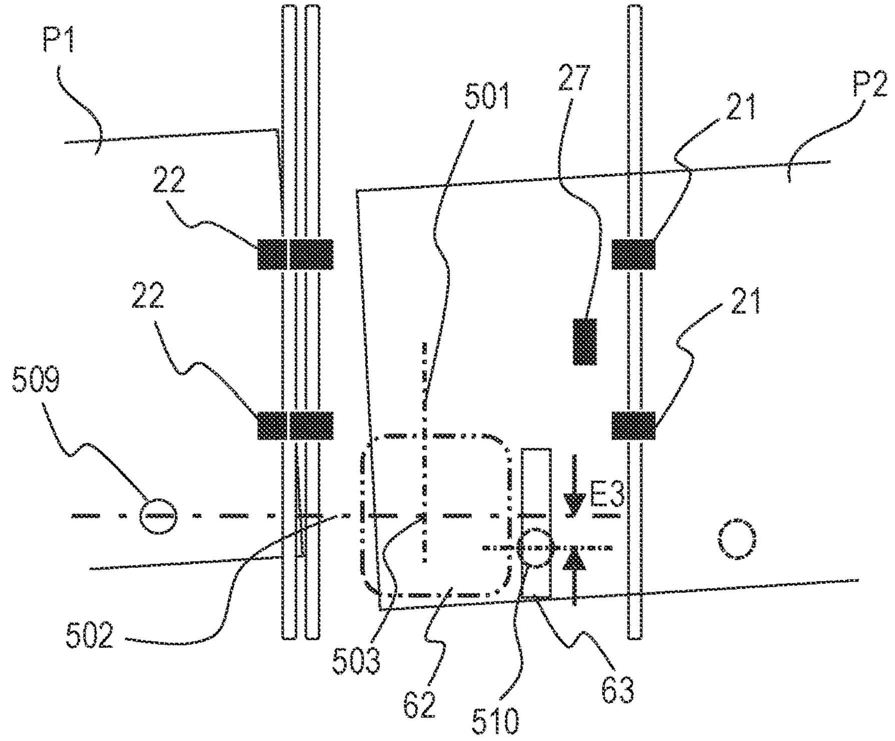

FIGS. 4A, 4B, 4C, 4D, 4E, 4F, 4G, and 4H are views showing a flow of a series of operations in which the punch unit 62 indicated by two-dot chain lines moves and punches the sheet P after the sheet P is conveyed from the image forming apparatus 1 to the post-processing apparatus 4, as viewing from above the post-processing apparatus 4. A one-dot chain line 502 is a center position of the punch 202 in the width direction, and a one-dot chain line 501 is a center position of the punch unit 62 in the conveying direction of the sheet P. A point 503 in which the one-dot chain line 502 intersects the one-dot chain line 501 indicates a center of the punching position of the punch unit 62 at each timing. In FIGS. 4A to 4G, an ideal position (predetermined position) 504 of a first hole, an ideal position (predetermined position) 505 of a second hole, and an ideal position (predetermined position) 506 of a third hole of a first sheet P1 are indicated by broken lines. In FIGS. 4D to 4H, an actual position 507 of the first hole after punching, an actual position 508 of the second hole after punching, and an actual position 509 of the third hole of the first sheet P1 are indicated by solid lines. In FIG. 4H, an ideal position 510 of a first hole of a second sheet P2 is indicated by a broken line.

FIG. 4A is a view showing a state in which a leading end Pa of the first sheet P1 reaches the inlet sensor 27. From a timing when the inlet sensor signal of the inlet sensor 27 changes, the motor controller 105 drives the punch motor 102 at a predetermined driving frequency to rotate the punch unit 62. The driving frequency is determined in advance from the conveyance speed of the sheet P. When the punch motor 102 is rotated by a predetermined number of steps, the punch unit 62 punches in the ideal position. At this time, it is desirable that a position of the punch unit 62 in the width direction of the sheet P be kept at a nominal position of the hole corresponding to the size of the sheet P to be conveyed. Further, the punch unit 62 is kept in the home position before the sheet P is conveyed to the post-processing apparatus 4, and is moved to the nominal position of the hole in the conveyed sheet P.

FIG. 4B shows a state in which the ideal position 504 of the first hole reaches the light emitting unit 63 and the line sensor 61. The post-processing controller 101 detects a timing in which an ideal position of a hole reaches the light emitting unit 63 and the line sensor 61 based on a detection result of the inlet sensor 27. At this time, the end position detection portion 113 detects an actual end position of the first sheet P1 based on a line sensor signal of the line sensor 61. The movement distance calculation portion 107 of the punch unit 62 calculates a difference E1 between an actual end position and an ideal position of the first sheet P1 detected by the end position detection portion 113. An end position detection portion 113 determines the calculated difference E1 as the movement distance of the punch unit 62.

FIG. 4C shows a state in which the motor controller 105 moves the punch unit 62 by a distance of the difference E1 in the width direction of the first sheet P1 by the punch unit moving portion 104. After the punch unit 62 is moved by the difference E1, the end position adjusting motor 103 is stopped while being excited. FIG. 4D is a view showing the actual position 507 of the first hole in a state in which the punch unit 62 completes a punching in the ideal position 504 of the first hole. FIG. 4E shows a state in which the ideal position 505 of the second hole reaches the light emitting unit 63 and the line sensor 61. A difference E2 between an actual end position and an ideal position of the first sheet P1 is determined as the movement distance in the same manner as in the case of the first hole. FIG. 4F shows a state in which the motor controller 105 moves the punch unit 62 in the width direction of the first sheet P1 by a distance of the difference E2 by the punch unit moving portion 104. As with the first hole, after the punch unit 62 is moved, the end position adjusting motor 103 is stopped while being excited.

FIG. 4G is a view showing the actual position 508 of the second hole in a state in which the punching in the ideal position 505 of the second hole is completed. After the punching in the actual position 508 of the second hole, a punching operation for the third hole is performed in the same manner. FIG. 4H shows a state in which the ideal position 510 of the first hole of the second sheet P2 reaches the light emitting unit 63 and the line sensor 61. A difference E3 is determined by the same method as the first sheet P1. The motor controller 105 moves the punch unit 62 from the actual position 509 of the third hole of the first sheet P1 in the width direction by the punch unit moving portion 104 to punch the first hole in the second sheet P2. The movement and punching of the punch unit 62 have been described above.

[About Electric Power and Operating Sound of Motor]

Figures 5A, 5B, 5C:
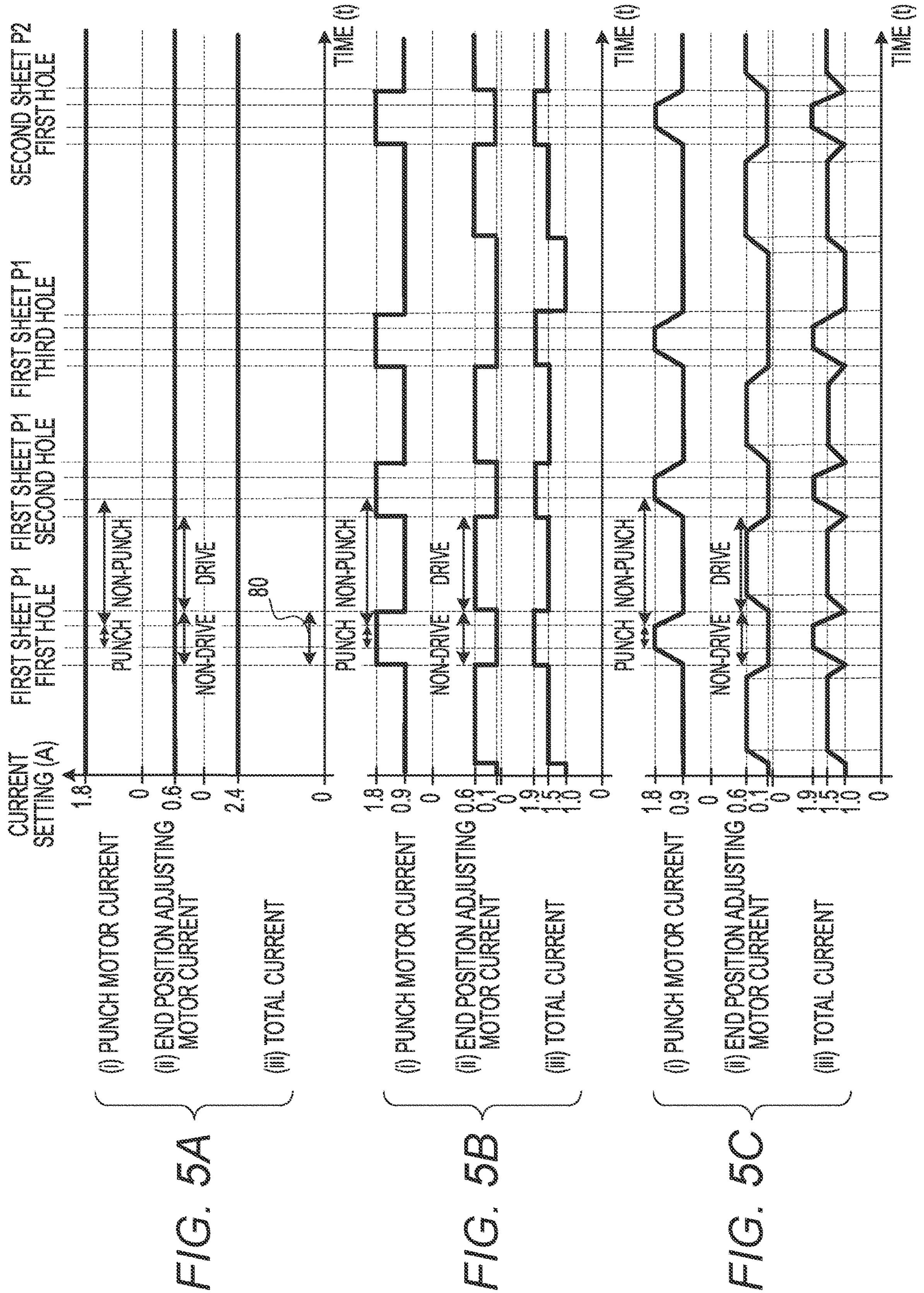
FIGS. 5A, 5B, and 5C are views showing a sequence of current setting of each motor according to the first embodiment.

Next, issues of electric power and operating sound of the motor will be described. FIG. 5A is a diagram showing a current setting of each motor in a case in which a constant current is set to each of the punch motor 102 and the end position adjusting motor 103, and a current setting obtained by summing them up, in terms of time axis. The item (i) shows a current (A) set in the punch motor 102. The item (ii) shows a current (A) set in the end position adjusting motor 103. The item (iii) shows a set current (A) of the sum of the item (i) and the item (ii). A horizontal axis indicates time (t).

The first hole, the second hole, and the third hole of the first sheet P1 and the first hole of the second sheet P2 are shown.

Here, an acute angle θ between the punching start position 70 and the punching end position 71 shown in FIG. 3D is defined as a punching section, and an angle (360°−θ) other than the acute angle θ is defined as a non-punching section which is a second section except the punching section. Further, a case where the punch unit moving portion 104 is moved will be described as driving, and a case where the punch unit moving portion 104 is not moved will be described as non-driving.

A current setting 1.8 [A] of the punch motor 102 is a setting capable of outputting a motor torque necessary for punching the sheet P. A current setting 0.6 [A] of the end position adjusting motor 103 is a setting capable of outputting a motor torque necessary for driving the punch unit moving portion 104. A current setting 1.8 [A] denotes a current setting capable of punching a sheet of a sheet type such as thick paper or gloss paper requiring a larger motor torque. As shown in FIG. 5A, in a case in which a constant current is supplied to the punch motor 102 and the end position adjusting motor 103 regardless of the punching or the non-punching, a total current setting becomes 2.4 [A]. At this time, the punch motor 102 may output motor torque necessary for driving the punch unit 62 in the non-punching section. Therefore, in the non-punching section, an unnecessarily large amount of current may flow through the punch motor 102. By passing the unnecessarily large amount of current, an amplitude of vibration of the punch motor 102 itself becomes large in the non-punching section of the punch motor 102, so that an operating sound of the punch motor 102 becomes large.

On the other hand, in the non-drive section of the end position adjusting motor 103, it is sufficient to output a holding torque necessary to stop the punch unit moving portion 104, that is, to keep the punch unit 62 stopped in the width direction. Therefore, in the non-drive section, an unnecessarily large current flows through the end position adjusting motor 103. The electric power and operating sound of the motor have been explained above.

[Method of Reducing Electric Power and Operating Sound]

Next, a method of reducing the electric power and the operating sound of the motor will be described. In FIGS. 5B and 5C, a current setting in at least a portion of the non-punching section of the punch motor 102 is set to 0.9 [A]. A current setting in the non-drive section of the end position adjusting motor 103 is set to 0.1 [A]. A current setting of each motor and a current setting obtained by summing them are shown on a time axis. The items (i) to (iii) are similar to FIG. 5A. Specifically, the current setting of the punch motor 102 is set to a first current value of 1.8 [A] in a section including at least the punch section, and the current setting of the punch motor 102 is set to a second current value of 0.9 [A] lower than the first current value in at least a portion of the non-punching section. The current setting of the end position adjusting motor 103 is set to a third current value of 0.6 [A] in the drive section, and the current setting of the end position adjusting motor 103 is set to a fourth current value of 0.1 [A] lower than the third current value in the non-drive section.

FIG. 5B shows a case in which the current setting is instantaneously changed in the punch motor 102 and the end position adjusting motor 103. In FIG. 5B, since it is desirable to set the current setting to 1.8 [A] before entering the punching section lest the motor torque becomes insufficient at the time of punching, the current setting is set to 1.8 [A] in a section such as a section 80 wider than the punching section. FIG. 5C shows a case where the current setting is changed in a stepwise manner with a slope before and after the punch section, and the current setting may be changed in this manner. At this time, the post-processing controller 101 stepwise changes current values of the punch motor 102 and the end position adjusting motor 103, but does not change the setting of the current value of one motor while changing the setting of the current value of the other motor.

By controlling as described above, a total current value becomes 1.9 [A] in the punch section and the non-driven section, and the total current value becomes 1.5 [A] in the non-punching section and the drive section, both of which are lower than the total current value 2.4 [A] of FIG. 5A. In an interval between the third hole of the first sheet P1 and the first hole of the second sheet P2, there is an interval (sheet-to-sheet interval) between a trailing edge of the first sheet P1 and a leading edge of the second sheet P2. In both FIGS. 5B and 5C, the current setting of the punch motor 102 is 0.9 [A], the current setting of the end position adjusting motor 103 is 0.1 [A], and the total current setting is 1.0 [A].

As shown in FIGS. 5B and 5C, if a change period of the current setting of the punch motor 102 and a change period of the end position adjusting motor 103 do not overlap with each other, the total current setting can be reduced in both peak and average by using either of methods of FIGS. 5B and 5C. Further, since the current of the non-punching section of the punch motor 102 can be reduced, the operating sound of the motor can also be reduced. The method of reducing power and operating sound has been described above.

[Flowchart of Punching and Movement Operation]

Figure 6:
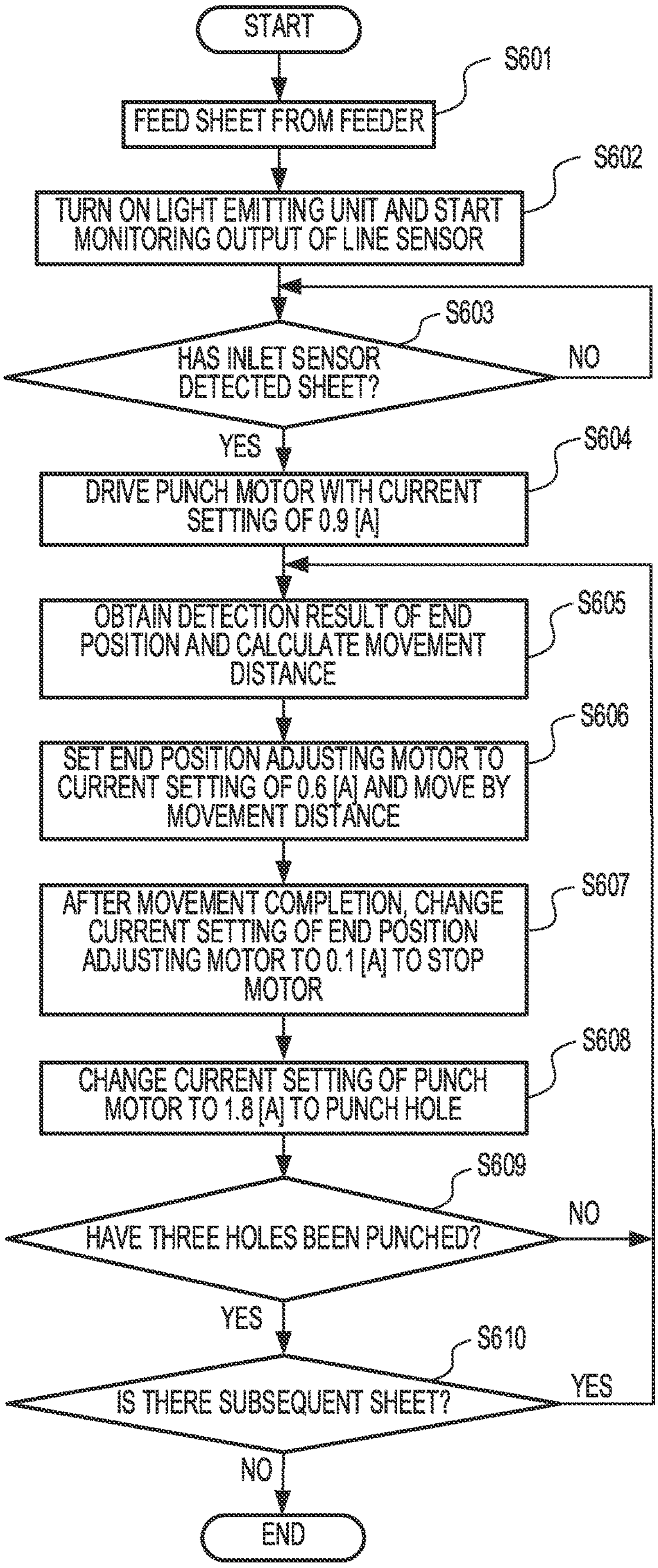
FIG. 6 is a flowchart illustrating a control according to the first embodiment.

Next, a flowchart of the punching operation and the movement operation of the punch unit 62 will be described with reference to FIG. 6. In step (hereinafter referred to as S) 601, the post-processing controller 101 is notified from the image formation controller 109 that the sheet P has been fed from the feeder 6. In S602, the post-processing controller 101 turns on the light emitting unit 63 by the end position detection portion 113, and starts monitoring the line sensor signal of the line sensor 61. In S603, the post-processing controller 101 determines whether the inlet sensor 27 has detected the sheet P via the sensor controller 108. If it is determined that the sheet P has been detected (YES in S603), the post-processing controller 101 advances the process to S604, and if it is determined that the sheet P has not been detected (NO in S603), the post-processing controller 101 returns the process to S603. In S604, the post-processing controller 101 drives the punch motor 102 through the motor controller 105 and the punch motor driver circuit 115 at the current setting of 0.9 [A]. The post-processing controller 101 drives the end position adjusting motor 103 at the current setting of 0.1 [A].

In S605, the post-processing controller 101 obtains a detection result of the end position of the sheet P by the end position detection portion 113, and calculates the movement distance (difference from the ideal position) of the punch unit 62 by the movement distance calculation portion 107. In S606, the post-processing controller 101 sets the current setting of the end position adjusting motor 103 to 0.6 [A], and moves the punch unit 62 by the movement distance calculated in S605. In S607, after the movement of the punch unit 62 is completed, the post-processing controller 101 changes the current setting of the end position adjusting motor 103 to 0.1 [A] and stops the operation. In S608, after the inlet sensor 27 detects the sheet P via the sensor controller 108, the post-processing controller 101 rotates the punch motor 102 by a predetermined number of steps, changes the current setting of the punch motor 102 to 1.8 [A], and punches the sheet P.

In S609, the post-processing controller 101 determines whether 3 holes have been punched in the sheet P. It is assumed that the post-processing controller 101 has a counter (not shown) that counts a number of holes and manages the number of holes. If it is determined that the punching of the 3 holes has not been completed (NO in S609), the post-processing controller 101 returns the process to S605, and if it is determined that the punching of the 3 holes has been completed (YES in S609), the post-processing controller 101 advances the process to S610. In S610, the post-processing controller 101 determines whether there is a sheet P (hereinafter referred to as a subsequent sheet) being subsequently conveyed. If it is determined that there is the subsequent sheet (YES in S610), the post-processing controller 101 returns the process to S605, and if it is determined that there is no subsequent sheet (NO in S610), the post-processing controller 101 ends the process. The flowchart of the punching and movement operation has been described above.

Thus, in the first embodiment, in the punch system in which the punch unit 62 is moved at an interval of punching, the electric power required for the punch system can be reduced, and the operating sound of the non-punching section of the punch motor 102 can be reduced. As described above, according to the first embodiment, a power consumption of the punch unit can be reduced, and the operating sound of the punch unit can be suppressed.

Second Embodiment

In a second embodiment, a description will be made with a content in which a current at the time of punching of the punch motor 102 explained in the first embodiment is set to an optimum current according to the sheet type. Thus, the electric power can be further reduced in the punch system. The post-processing apparatus 4, the image forming apparatus 1, and the movement operation and the punching operation of the punch unit 62 are the same as those of the first embodiment, and therefore the contents thereof will be omitted.

[Determination of Current Setting of Punching Section]

A description will be made with a method of converting sheet type information obtained from the image formation controller 109 by the post-processing controller 101 to the current setting of the punch section and then changing to the current setting of the punch section. The sheet type information may be obtained by either of the following two methods.

The first one is a method of using a sheet type detection signal outputted from the sheet type sensor 111 as a third detection device. The post-processing controller 101 changes the current value in the punching section of the punch motor 102 according to the sheet type of the sheet P detected by the sheet type sensor 111. In FIG. 2, the image formation controller 109 includes the sheet type determination portion 112 configured to convert the sheet type detection signal outputted from the sheet type sensor 111 into sheet type information. The sheet type sensor 111 irradiates the sheet P with ultrasonic waves using, for example, an ultrasonic sensor, and discriminates, for example, a basis weight of the sheet P based on an acoustic wave level of the ultrasonic waves transmitted through the sheet P. Thus, the basis weight of the sheet P may be used as the sheet type information. In addition to the ultrasonic sensor, an optical sensor configured to detect a surface property of the sheet P may be used to convert the detection signal to sheet type information based on the basis weight and the surface property of the sheet P. The second one is a method of using sheet type information inputted by the user to the control panel 110 as an input device. The post-processing controller 101 changes the current value in the punching section of the punch motor 102 based on the sheet type information inputted by the control panel 110.

The image formation controller 109 outputs the sheet type information converted by the sheet type determination portion 112 or the sheet type information inputted from the control panel 110 to the post-processing controller 101. The post-processing controller 101 determines the current setting of the punching section of the punch motor 102 based on the sheet type information inputted from the image formation controller 109.

For example, the current setting corresponding to the sheet type information shown in Table 1 may be used. The information (e.g., a table) relating the sheet type information and the current setting may be stored in advance in a storage unit (not shown) of the post-processing controller 101.

TABLE 1

| Seat Type | Current Setting (A) |
|---|---|
| A | 1.8 |
| B | 1.5 |
| C | 1.7 |
| D | 1.6 |
| E | 1.4 |
| F | 1.5 |
| G | 1.2 |
| H | 1.7 |
| I | 1.3 |
| J | 1.6 |

The first column of Table 1 shows the sheet types (A-J), and the second column shows the current setting (A). For example, it is assumed that the sheet type of the sheet P is "Sheet Type A" based on the sheet type information converted by the sheet type determination portion 112 or the sheet type information inputted from the control panel 110. In this case, the motor controller 105 sets the current setting of the punching section to 1.8 A for the punch motor 102. The determination of the current setting of the punching section has been described above.

[Flowchart of Punching/Movement Operation]

Figure 7:
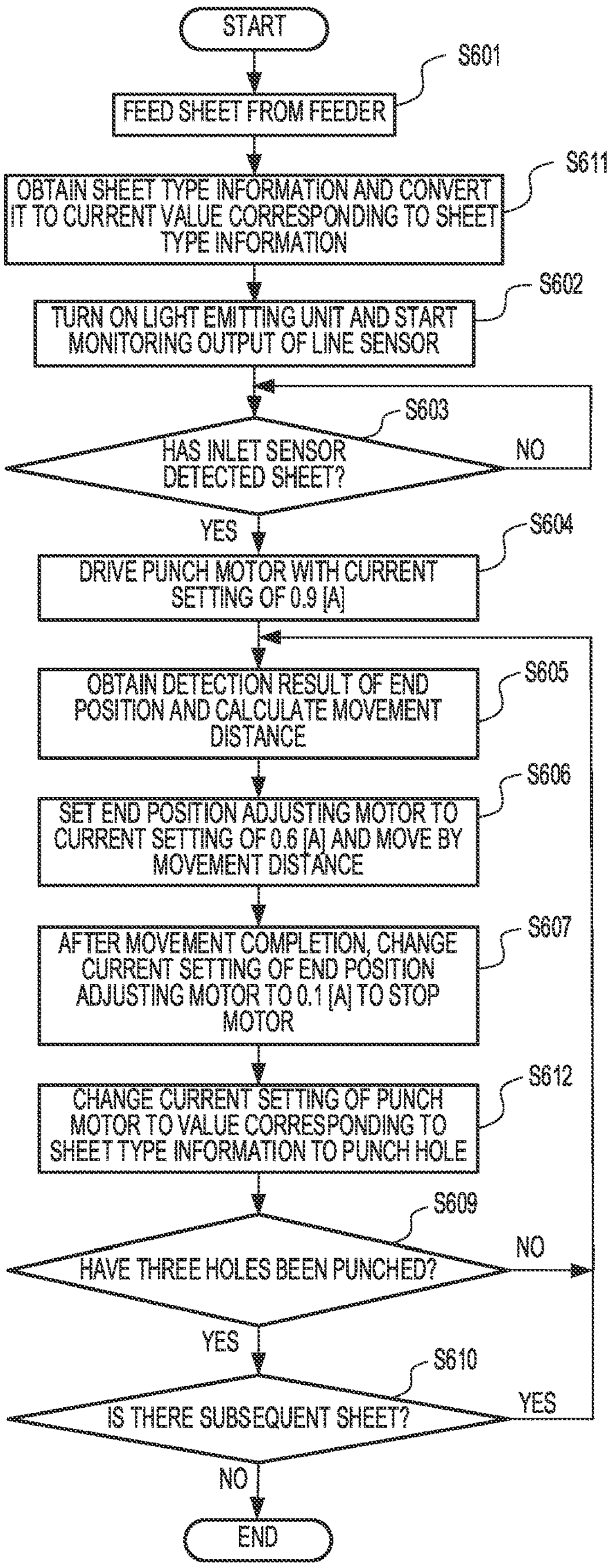
FIG. 7 is a flowchart illustrating a control according to the second embodiment.

Next, a flowchart shown in FIG. 7 of the second embodiment will be described. The same processes as those described with reference to FIG. 6 in the first embodiment are denoted by the same step numbers, and description thereof will be omitted. In S611, the post-processing controller 101 obtains the sheet type information outputted from the image formation controller 109 and converts it into a current value corresponding to the sheet type information based on, for example, Table 1 (to determine a set current). In S612, the post-processing controller 101 changes the current setting to the current value of the punch motor 102 determined in step 611. Thus, the post-processing controller 101 can change the current setting of the punch motor 102 to a current setting corresponding to the sheet type information to punch the sheet P. The flowchart of the punching and movement operation has been described above.

As described above, according to the second embodiment, the electric power can be further reduced by changing the current at the time of punching of the punch motor 102 to an optimum current setting according to the sheet type. As described above, according to the second embodiment, the power consumption of the punch unit can be reduced, and the operating sound of the punch unit can be suppressed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-185688, filed Nov. 6, 2020, which is hereby incorporated by reference herein in its entirety.

What is claimed is:

1. A post-processing apparatus to perform a post-processing for a sheet conveyed from an image forming apparatus, the post-processing apparatus comprising:

a punching unit configured to punch the sheet, wherein the punching unit includes a punch configured to rotate to punch the sheet, and a moving unit configured to move the punch in a width direction intersecting with a sheet conveying direction;

a first motor configured to rotate the punch;

a second motor configured to move the moving unit; and a control unit configured to control the first motor and the second motor, wherein, in a first section from a first position in which the punch starts punching the sheet to a second position in which the punching ends, the control unit sets a current value for driving the first motor to a first current value, wherein, in a second section other than the first section, the control unit can set the current value for driving the first motor to a second current value lower than the first current value, and wherein, in a case in which the punching unit is moved in the width direction to punch a second hole in one sheet with the punching unit after a first hole is punched in the one sheet by the punching unit, the control unit does not change one of the current value of the first motor and the current value of the second motor while changing the other of the current value of the first motor and the current value of the second motor.

2. The post-processing apparatus according to claim 1, wherein the control unit sets a current value for driving the second motor to a third current value when the punch is moved in the width direction by the moving unit, and wherein the control unit sets the current value for driving the second motor to a fourth current value lower than the third current value when the punch is maintained in a state in which the punch is stopped at a stopping predetermined position in the width direction by the moving unit.

3. The post-processing apparatus according to claim 2, further comprising:

a first roller configured to receive the sheet conveyed from the image forming apparatus; and a first detection device disposed on a downstream side of the first roller with respect to the sheet conveying direction and configured to detect the sheet being conveyed, wherein, in a case in which the control unit determines that the sheet has reached the post-processing apparatus based on a detection result of the first detection device, the control unit sets the current value of the first motor to the first current value.

4. The post-processing apparatus according to claim 3, further comprising:

a second detection device configured to detect a position of an end portion of the sheet in the width direction; and a calculation unit configured to calculate a distance, by which the punch is moved to a predetermined position by the moving unit, based on a detection result of the second detection device, wherein, in a case in which the distance is calculated by the calculation unit, the control unit sets the current value of the second motor to the third current value.

5. The post-processing apparatus according to claim 4, wherein the control unit sets the current value of the second motor to the fourth current value after the punch has been moved the calculated distance by the moving unit.

6. The post-processing apparatus according to claim 5, wherein, in a case in which the punch is fallen into the state in which the punch is stopped at the stopping predetermined position by the moving unit, the control unit sets the current value of the first motor to the first current value.

7. The post-processing apparatus according to claim 2, wherein when changing current value, the control unit stepwise changes the current value of the first motor and the current value of the second motor.

8. The post-processing apparatus according to claim 2, wherein the image forming apparatus includes a third detection device configured to detect a sheet type of the sheet, and wherein the control unit changes the first current value according to the sheet type detected by the third detection device.

9. The post-processing apparatus according to claim 2, wherein the image forming apparatus includes an input device configured to input a sheet type of the sheet, and wherein the control unit changes the first current value according to the sheet type inputted by the input device.

10. The post-processing apparatus according to claim 1, wherein the first motor is a first stepping motor.

11. The post-processing apparatus according to claim 10, wherein the second motor is a second stepping motor.

* * * * *